Feb. 26, 1963
J. R. JOHNSON
3,079,273
THERMALLY RESISTANT ARTICLES AND METHOD
FOR THEIR FABRICATION
Filed May 7, 1957
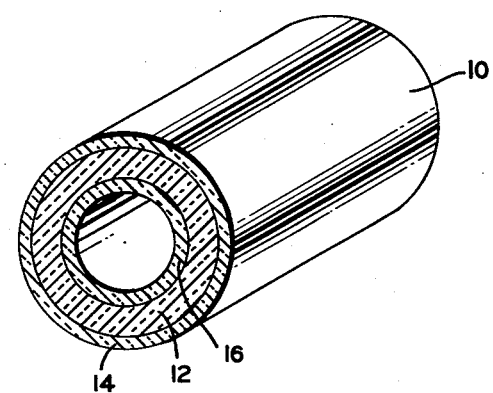
INVENTOR.
JAMES R. JOHNSON
BY Frank A. Stead
ATTORNEY

United States Patent Office 3,079,273
Patented Feb. 26, 1963

3,079,273
THERMALLY RESISTANT ARTICLES AND
METHOD FOR THEIR FABRICATION
James R. Johnson, White Bear Lake, Minn., assignor to
Minnesota Mining and Manufacturing Company, St.
Paul, Minn., a corporation of Delaware
Filed May 7, 1957, Ser. No. 657,503
12 Claims. (Cl. 117—46)

This invention relates to articles of manufacture comprised of siliconized silicon carbide, and to processes for their production.

Siliconized silicon carbide is a substance which is known to be highly thermally resistant and to be useful in the production of articles of manufacture which are to withstand great heat. Thus, for example, the use of siliconized silicon carbide as a material for construction of heat exchangers, or as nuclear reactor fuel elements, which are designed to operate at high temperatures, would be very desirable, because this material becomes stronger as it is heated up to temperatures in the range of about 2400° F. Such fuel elements, or heat exchangers, must have relatively thin walls in order to assure high rates of heat transfer. However, it has heretofore been found to be impossible to produce useful siliconized silicon carbide articles of this nature having wall thickness less than about ⅛″. This thickness is far too great to permit the use of the material for the purposes mentioned. Furthermore, the artifices which have heretofore been employed in attempting to prepare objects of intricate shapes, and composed of siliconized silicon carbide, have been found to give rise to an amount of shrinkage occurring between the initial preparation and the completed article of manufacture. Dimensional precision has therefore been difficult to control. Consequently, no self-supporting structures which satisfactorily utilize the unique properties of siliconized silicon carbide in such applications have heretofore been available.

It is an object of this invention to provide a plastic workable mass which permits the manufacture of thin-walled articles composed essentially of siliconized silicon carbide. It is another object of the invention to provide articles of manufacture which utilize the unique properties of siliconized silicon carbide as welding agents. Yet another object of the invention is to provide siliconized silicon carbide-coated amorphous carbon or graphite articles, and a method for their production. It is a still further object of the invention to provide a novel process for the production of articles of manufacture composed essentially of siliconized silicon carbide.

In accordance with the above and other objects of the invention, I have found that a plastic mass composed of finely divided carbon and silicon carbide, with a minor amount of a film-forming polymeric binder can be formed into sheets having very thin cross sections. Such sheets can be produced with thicknesses as small as a few thousandths of an inch. A sheet thus prepared is more or less flexible and leathery and can be shaped into any desired form by cutting, dieing out, stamping, bending, or by joining sheets of appropriate configuration, and thereafter can be treated by heating in the presence of excess silicon to a temperature which is sufficient to destroy or vaporize the binder and to convert the remaining fabrication composed of silicon carbide and carbon to siliconized silicon carbide. In its broader aspect, the scope of the invention includes the use of the aforesaid plastic mass containing finely divided carbon and silicon carbide in a relatively less viscous form for the purpose of coating refractory articles, such as those made of graphite. When the articles thus coated are thereafter subjected to the action of heat in the presence of excess silicon, the coating is converted to a continuous, tightly adherent film of siliconized silicon carbide. In a still further aspect of the invention, I have found that the plastic mass heretofore described, together with silicon, can be employed as a welding agent for the purpose of joining the components of articles of manufacture made of graphite and/or amorphous carbon. These discoveries have resulted in several highly advantageous and heretofore unobtainable achievements.

By the use of my invention in its several aspects, it is possible to prepare intricate thin-walled shapes of siliconized silicon carbide which take advantage of the unique high temperature refractory nature of this substance. In this way it is possible to fabricate various articles required for operation at high temperature, as for example, nuclear reactor fuel elements, heat exchangers and the like, of siliconized silicon carbide. Furthermore, useful fabrications comprising carbon or graphite can be made using the methods of the invention. It is well known that graphite is one of the best refractories obtainable for use at high temperature, but graphite is subject to a serious disadvantage in that it becomes reactive at high temperatures and therefore may be converted to gaseous substances if it is over-heated in air. However, graphite articles which have been coated with siliconized silicon carbide are much less subject to reaction on heating. The coating of siliconized silicon carbide produced by use of the plastic carbon and silicon carbide-containing mass of the invention appears to bond itself integrally to the surface of the graphite or carbon article and no change in weight of such a coated article can be observed even when it is heated to a temperature far beyond that at which the graphite normally would disappear. The coating is very firmly attached to the surface and is not removed by thermal shock or mechanical shock which does not destroy the article itself. Additionally, I have found it possible to take advantage of the unique characteristics of siliconized silicon carbide in bonding intimately to the surface of graphite in a novel method for welding graphite or carbon components together. The term "welding" as used herein is to be understood as referring to the process for joining graphite or carbon articles whereby siliconized silicon carbide forms a bonding agent in accomplishing the desired result, as disclosed herein. The bond thus produced is stronger than the graphite or carbon, and in addition has better heat conductivity than these materials.

The plastic mass which I employ in realizing the various advantages of my invention compreses a substantially homogeneous mixture of about 100 parts of finely divided carbon, 100 to 500 parts of finely divided silicon carbide, and 5 to 50 parts of a film-forming polymer.

As is well known in the art, the properties of the particular polymer used as a binder can be suitably adjusted by the addition of adjuvants such as plasticizers, solvents, wetting agents and the like. A minor amount of wetting agent is preferably added in order to facilitate the formation of a homogeneous mass, homogeneity being necessary if undesirable striations, fractures, and the like are to be avoided in the end product. Such wetting agents as alkyl ethers of polyalkylene glycols, ethyl phenyl glycol or other alkylarylpolyether alcohols, polyoxyethylene acetate, or other polyoxyethylene esters and the like are suitable. The consistency of the plastic mass can be varied so as to be in any state from a very thick, viscous substance to a thin, paint-like material. Such variations are readily accomplished as, for example, by the introduction of one or more solvents into the polymeric binder, the amount of solvent being adjusted so that the desired consistency is achieved. Examples of solvents which are suitable are toluene, xylene, ethanol, butanol, acetone, methyl isobutyl ketone, isopropanol, diacetone alcohol, benzene and the like. The solvent which is selected in the individual case will of course depend upon the composition of the polymeric binder which is used; but the actual solvent employed is not critical since it is effectively removed by evaporation during stabilization of the fabricated plastic mass. Alternatively, where a thermoplastic resin is used in the polymeric binder, the viscosity of the plastic mass can be varied simply by heating the composition to a greater or lesser degree and where it is a 100% solids thermosetting resin, such as an epoxy-type resin, the viscosity of the plastic mass can be varied according to the composition and cure-history of the resin.

The polymer which is used in the present invention need only be characterized by its film-forming property. It is immaterial for the purpose of the present invention whether the polymeric binder vaporizes or whether it chars to carbon and ash upon heating to 3000 to 4000° F. Thus, "heating at 3000° F. to 4000° F. until the polymeric binder is eliminated" should be understood as meaning that the fabrication is heated until the polymeric binder is eliminated as a binder, regardless of whether any carbon and/or ash is left behind. Thermosetting or thermoplastic, high molecular weight plastics or elastomers can be used, e.g. poly-vinyl-type resins such as polyvinyl chloride, polystyrene, polymethyl methacrylate, polyvinyl acetate, polyvinyl laurate, polyvinyl stearate, polyethyl acrylate, polyoctadecyl acrylate, polyoctadecyl methacrylate, polyvinyl ethyl ether, polyvinyl butyl ether, polyvinyl isobutyl ether, polyvinyl octyl ether, polyvinyl 2-chloroethyl ether, and the like, polyesters such as poly-diethylene glycol adipate, poly-ethylene glycol terephthalate, poly-propylene glycol suberate, poly-diethylene glycol suberate, poly-1,4 butylene glycol sebacate, poly-ethylene glycol maleate, poly-2,2 dimethyl 1,3 propanediol adipate, poly-propylene glycol adipate, poly-diethylene glycol azelaate, and the like, polyesters cross-linked with diisocyanates, phenol formaldehyde resins, epoxy resins, melamine resins, urea-formaldehyde resins, polyethylene, fluorinated alkyl acrylate-type resins such as poly-1,1-dihydroperfluorobutyl acrylate, poly-1,1-dihydroperfluorooctyl methacrylate, and the like, poly-tetrafluoroethylene, poly-chlorotrifluoro ethylene, polyhexafluoropropene, vinylidene fluoride, copolymers of the monomers of the above (and other) resins, elastomers such as poly-styrene-butadiene (GRS rubber), nitrile rubbers, chloroprene rubbers, butyl rubbers, and the like.

Alternatively to the use of already-formed polymers, it will be obvious that polymers or copolymers can be formed in situ in the plastic mass by mixing appropriate amounts of monomers with the carbon and silicon carbide, and initating polymerization in the mixture.

As noted hereinabove, it is expedient to utilize a plasticizer with certain resin systems in order to improve the flexibility and workability of the solvent-free film. With other resin systems, no plasticizer is ordinarily needed, and in fact some polymers may be said to be internally plasticized (e.g. polyacrylate esters of long-chain alcohols).

Whatever wetting agent, plasticizer, solvent and polymer combination is used in the polymeric binder should, of course, form a compatible solution.

In order to produce a homogeneous, fine-grained, non-porous article capable of accomplishing the objects of the present invention, it has been found that the carbon and silicon carbide particles in the plastic mass should not be more than about 50 microns in diameter and the term "finely divided" as used herein carries this limitation. If coarser fillers are used, for example, the non-porous property of the final article, which makes it possible to maintain coated carbon or graphite articles at high temperatures for indefinite periods without appreciable corrosion by oxidation, is lost.

In addition to the constituents set forth hereinabove, other substances which are not adversely affected by the temperatures later used for siliconizing can be incorporated with the plastic mass for accomplishing specific purposes. Thus, for example, uranium dioxide in amount up to about 50 percent, based on the total amount of solids, can be added before fabrication.

For the preparation of articles of manufacture, the plastic mass which has been adjusted to a suitable viscosity is preferably spread in a film or layer of suitable thickness, preferably of uniform thickness over the entire area, and conveniently upon a backing surface to which it does not adhere, and which is not adversely affected by any solvent which may be contained in the plastic mass. This backing or supporting surface may be of any impervious non-porous material such as polytetrafluoroethylene, poly-ethylene glycol terephthalate, cellulose acetate, cellophane (regenerated cellulose), and the like.

The plastic mass is then stabilized in this form, by heating the plastic mass until it is solid if a 100% solids polymeric binder has been used, by permitting the solvent to evaporate if a solvent has been used or, if a thermoplastic material has been used, by permitting the film to cool. A stabilized sheet results, which can be stripped from the backing whenever desired. (Alternatively, where the backing or supporting surface is composed of a polymeric film or the like which is eliminated under the temperature conditions to which the stabilized configuration is later subjected as set forth hereinafter, the backing need not be removed.) The resulting stabilized sheet retains considerable flexibility, and can be cut, stamped or died out, or otherwise formed into any desired shape by the usual methods, consideration of course being given to the relatively fragile nature of the very thin films which can be employed. To strengthen such thin films, they can be corrugated or shaped into other configurations which have a stiffening effect, as by dimpling or embossing. If the final product is to be formed of several joined parts, the component parts are cemented together using the plastic mass hereinabove described as a cement or bonding agent. Alternatively, the plastic mass may be formed by extrusion, without loss of the advantageous absence of shrinkage and consequent adherence to predetermined dimensional tolerances. The article thus fabricated is placed in a suitable furnace, or is heated by other means, to a temperature in the range of about 3000° to 4000° F., (in a carbon-inert atmosphere such as in helium if desired) in the presence of an excess of silicon. The term "an excess of silicon" is used herein to mean a sufficient amount of silicon to form silicon carbide with all of the carbon with which it comes in contact and to fill any voids in the thus-formed silicon carbide structure so that an impervious, dense, gasproof layer of siliconized silicon carbide is formed. At this temperature, the resin is vaporized or destroyed as a binder almost immediately and the silicon is melted. The destruction of the binder has left the prefabricated shape in the form of an intermediate structure containing carbon and silicon carbide, and the silicon which has melted infiltrates this body and reacts with the carbon contained therein to form more silicon carbide. Furthermore, all of the silicon carbide particles are wetted with molten elemental silicon. The siliconizing process thus performed requires about 30 to 60 seconds for completion. In comparison with the siliconizing processes of the prior art, which are completed in a very much shorter time and with a certain amount of mechanical shock to the fabricated article, the process of the application is relatively gentle. Thus, there is substantially no mechanical stress imposed on the fabricated shape during siliconizing by the process of the invention. Further, the slower reaction minimizes any tendency toward inclusion of gases and consequent voids in the finished product. A particular advantage which resides in this aspect of the invention results from the fact that no dimensional change or warpage occurs during the siliconizing process. Thus it is possible by using 100% solids polymeric binder such as an epoxy resin, to prefabricate the plastic mass in essentially the dimensions which are desired in the final product. The result is an impervious article of manufacture comprised of a two-phase mixture of silicon carbide and silicon. This material may also be termed siliconized silicon carbide.

In the coating of refractory graphite surfaces or the like, a procedure similar to that above described is followed, except that a thinner or less viscous plastic mass is prepared, which is spread in a film which may be of substantially uniform thickness over the surface to be coated. However, the film may be made thicker or thinner at will in areas which require more or less protection. Any solvent which may be present is evaporated, or the coating may be otherwise stabilized, as set forth hereinabove in conection with the fabrication of articles from the plastic mass or mixture, and the article is then placed in a suitable furance and in the presence of elemental silicon, and is rapidly heated to a temperature in the range above specified, preferably in an inert atmosphere as hereinabove set forth. A uniformly coated article results; that is, an external, continuous, impermeable film of siliconized silicon carbide is formed on the surfaces thus coated. It has been found that such coatings upon graphite are exceedingly tenaciously held and cannot be removed mechanically therefrom.

This process can be represented by the following flow diagram:

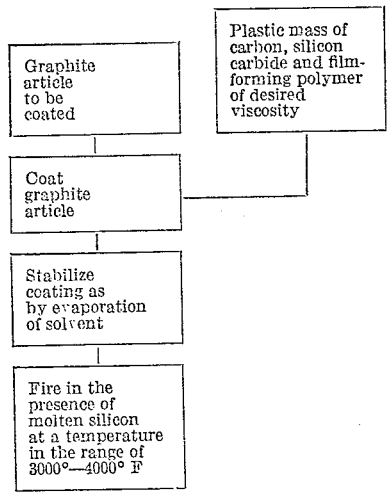

When used as a thermally activated cement or welding agent for joining graphite components, the plastic mass is coated on at least one of the surfaces to be jointed in a thin, uniform film. The surfaces to be joined are then brought into juxtaposition, while the coating is still in a condition where it will wet and adhere to itself or the other surface; i.e. before stabilization. The solvent, if any is present, is then evaporated; or the composition if thermoplastic is cooled; or further, if the composition is thermosetting, it is conveniently heated until set. The joints thus made generally are self-supporting in the further treatment thereof. Obviously where complicated shapes are involved, the parts may be held in position, as with a jib or by other convenient means. The joint thereafter is heated in an inert atmosphere and in the presence of elemental silicon to a temperature sufficient to melt the silicon and drive off the resin. The elemental silicon flows into the joint and the resulting siliconized silicon carbide makes a gas tight seal between the parts to be joined which is stronger than the graphite itself.

The following specific examples, which are intended only to be illustrative and not limiting in any sense, will serve to describe specific applications of the invention. All parts are by weight.

EXAMPLE 1

*Preparation of Fabricated Articles Having Thin Cross Sectional Dimensions*

A plastic mixture is prepared consisting of 39.4 parts of polyvinyl butyral (which may be obtained under the trade name "Butvar" from the Shawinigan Resin Corporation), 15.8 parts of a polyalkylene glycol plasticizer, 3.5 parts of "Tergitol" (a wetting agent sold by Carbide and Carbon Chemicals Company which contains lower alkyl ethers of polyethylene glycol), 33 parts of micronized graphite (particle size 2 to 10 microns, available from the Dixon Crucible Co.), 67 parts of 325 mesh coke, 33 parts of 600 mesh silicon carbide and 200 parts of 1000 mesh silicon carbide. A sufficient amount of toluene is added to make the mixture substantially liquid. Mixing is continued until the mixture is substantially homogenous, and then a thin film is prepared by knife-coating the plastic mixture on a sheet of a polymer such as polyethylene terephthalate to a thickness of three thousandths of an inch. The film thus prepared is warmed slightly to evaporate the toluene therefrom. A plastic film is obtained containing carbon, silicon carbide and the resin mixture described. It does not adhere to the polymer sheet, and can easily be stripped off, yielding the film in a sufficiently workable condition to permit the fabrication of substantially any shape therefrom. Alternatively, the film can be stored for any desired length of time, before or after stripping from the supporting sheet, before use. When the desired configuration has been prepared, utilizing the wet mixture as a cement if several component parts thereof are to be joined together, the prefabricated article and a quantity of silicon are placed in a graphite resistance furnace operating at a temperature between about 3500 and 4000° F. After a few seconds of heating, the plastic mixture disappears leaving a shape composed of the initial carbon and silicon carbide in the basic mixture. The silicon melts and infiltrates the carbon-silicon carbide structure. The molten silicon reacts with the elemental carbon, whereupon silicon carbide is formed in situ, and furthermore the molten silicon infiltrates and surrounds all of the particles of silicon carbide. After cooling, the article is removed from the furnace and is found to have considerable strength when cold.

The same procedure is followed, increasing the thickness of the knife-coated film up to thirty thousandths of an inch, to produce equally useful, but correspondingly thicker, films and articles prepared from such films.

EXAMPLE 2

Articles similar to those in Example 1 are prepared from a plastic mixture of 37 parts of polyvinyl ether, 100 parts of carbon and 233 parts of silicon carbide (the individual particles of carbon and silicon carbide being smaller than 325 mesh).

Other resins which are suitable for use in the plastic mix are polyvinyl chloride, polymethyl methacrylate and polyvinyl isobutyl ether.

EXAMPLE 3

*Welding of Graphite and Carbon Articles*

A plastic mixture is prepared which consists of 24.8 parts of polyvinyl butyral, 10.0 parts of a polyalkylene glycol plasticizer, 2.2 parts of "Tergitol" wetting agent, 33 parts of micronized graphite, 67 parts of 325 mesh coke, 33 parts of 600 mesh silicon carbide and 200 parts of 1000 mesh silicon carbide. Toluene or xylene is added until the mixture is substantially liquid. The mixture is placed in a tumbler mill for 24 hours, at the end of which time it is substantially homogeneous. This mixture may then be used to "weld" together components of articles of manufacture made of graphite and/or amorphous carbon. One or both of two surfaces which are to be welded together are coated with the plastic mixture and are brought together. A jig may be used if desired to maintain the two parts in the proper relative position. The parts are then placed in a graphite resistance furnace operating at a temperature of between 3500 and 4000° F. and which contains an excess of elemental silicon. The parts are removed from the oven after a dwell time of between 30 seconds and one minute. The parts are found to be joined together by a dense non-porous bond which is stronger than the parts themselves.

Similar results can also be obtained using plastic mixtures which contain phenol formaldehyde resins, melamine resins or urea formaldehyde resins.

EXAMPLE 4

*Coating of Graphite or Amorphous Carbon Articles*

The plastic mixture of Example 3 can also be used to coat carbon or graphite parts, the viscosity of the mixture being adjusted to a creamy consistency by the addition of a solvent. The coatings can be applied by brush, roll, spray, dip, or any other convenient technique. They can be applied in a single layer or in several layers, and either evenly over the entire surface of the article or in varying thicknesses. Thus a thicker coating can be applied in an area where extreme wear or erosion, as by hot gases, will be encountered by the finished part. The coated articles are placed in an oven which is operating at between 3500 and 4000° F. and to which a charge of silicon metal has just previously been added. After a dwell time of between 30 seconds and one minute in the oven, the articles are removed. They are found to be covered with a siliconized silicon carbide coating, which is sufficiently dense and non-porous to eliminate erosion of the part by oxygen at very high temperatures. In addition, it is found that no dimensional change or warpage has occurred during the siliconizing.

A graphite tube about ½ inch in diameter and 2½ inches long, intended for use as a connecting element for conducting high temperature oxygen-containing gases, is substantially uniformly coated over its entire internal and external surfaces with a plastic mixture as described. The solvent is permited to evaporate, with gentle heating, and the tube, having the resulting stabilized layer on its surfaces, is placed in a furnace operating at about 3500° F., together with an excess of silicon. After about 30 seconds at this temperature, the coating is completely siliconized and the tube is removed from the furnace. After cooling, the tube is found to be covered with a dense, tightly adherent gas-proof coating of siliconized silicon carbide.

The coated articles of the invention are further illustrated by reference to the accompanying drawing showing a view in isometric projection of a cross-section of a graphite tube coated according to the process of the invention. In the drawing, the coated tube is generally indicated at 10. The graphite body of the tube is shown at 12, and it is coated inside and out with a layer 14 externally and a layer 16 internally of dense, siliconized silicon carbide which is tightly adherent to the graphite body of the tube. The dimensions of the article are exaggerated for clarity, particularly the thickness of the coating of siliconized silicon carbide.

EXAMPLE 5

*Preparation of a Nuclear Reactor Fuel Element*

Two lots of plastic mix are prepared. The first contains 39.4 parts of polyvinyl butyral, 15.8 parts of polyalkylene glycol plasticizer, 3.5 parts of "Tergitol" wetting agent, 33 parts of micronized graphite (particle size 2 to 10 microns, available from the Dixon Crucible Co.), 67 parts of 325 mesh coke, 33 parts of 600 mesh silicon carbide and 200 parts of 1000 mesh silicon carbide. The second lot of plastic mix contains approximately the same relative amounts of the same constituents as the first lot and, in addition, not more than about 400 parts of uranium oxides, uranium carbides, or uranium silicides or a combination of them. Sufficient solvent is added to both lots to render them substantially liquid and both are mixed until they are homogeneous. A thin film of the first lot is knife coated on a sheet of a polymer such as polyethyleneterephthalate, to which the mix will not adhere when it is solidified. The solvent is evaporated and a thin film of the second lot is knife coated over the first film. This film is in turn dried and then a third layer of the first lot is coated over the first two and it is also dried. This sandwich construction, which can be stripped from the supporting film, forms the basic material for the fabrication of shapes for nuclear fuel reactor elements.

Other resin systems, which can be used in place of the polyvinyl butyral, are polyesters cross linked with diisocyanates, phenol-formaldehyde resins, polyethylene, fluorinated alkyl acrylates, polystyrenebutadiene copolymers, nitrile rubbers, and butyl rubbers.

What is claimed is:

1. The method for fabricating articles comprised essentially of siliconized silicon carbide, which consists in preparing a plastic mass consisting essentially of a substantially homogeneous mixture of about 100 parts by weight of finely divided carbon, about 100 to 500 parts by weight of finely divided silicon carbide, and about 5 to 50 parts by weight of a film-forming polymer; forming the plastic mass to the desired configuration; stabilizing the formed mass in the desired configuration; and subjecting the stabilized configuration to a temperature in the range of about 3000° to 4000° F. in the presence of an amount of molten silicon at least sufficient to react with all of the carbon which is present to form silicon carbide therefrom, to wet each particle of silicon carbide which is present with silicon, and to fill all voids in the silicon carbide structure; and continuing the said heating for a period of time sufficient to eliminate the said polymer and convert the stabilized configuration to siliconized silicon carbide.

2. The method according to claim 1, wherein the stabilized configuration is subjected to a temperature in the range of about 3000 to 4000° F. in the presence of an excess amount of silicon for a period of about 30 to 60 seconds.

3. The method according to claim 1, wherein the film-forming polymer is polyvinyl ether.

4. The method for fabricating articles comprised of silicon and carbon, and consisting at least in part of siliconized silicon carbide, which consists in forming a plastic mass consisting essentially of a substantially homogeneous mixture of about 100 parts by weight of finely divided carbon not more than about 50 microns in diameter, about 100 to 500 parts by weight of finely divided silicon carbide not more than about 50 microns in diameter and about 5 to 50 parts by weight of a film-forming polymer into a predetermined configuration; stabilizing the formed mass in the predetermined configuration; and subjecting the stabilized configuration to a temperature in the range of about 3000 to 4000° F. in the presence of an amount of molten silicon at least sufficient to react with all of the carbon which is present in the said plastic mass to form silicon carbide therefrom, to wet each particle of silicon carbide which is present with silicon, and to fill all voids in the silicon carbide structure; and continuing the said heating for a period of time sufficient to eliminate the said polymer and convert the stabilized configuration to siliconized silicon carbide.

5. The method according to claim 4, wherein the stabilized configuration is subjected to a temperature in the range of about 3000 to 4000° F. for about 30 to 60 seconds.

6. The method for fabricating articles consisting at least in part of siliconized silicon carbide, which consists in forming a plastic mass consisting essentially of a substantially homogeneous mixture of about 100 parts by weight of finely divided carbon not more than about 50 microns in diameter, about 100 to 500 parts by weight of finely divided silicon carbide, not more than about 50 microns in diameter, up to about 400 parts by weight of a compound selected from the group consisting of the oxides, carbides and silicides of uranium, and about 5 to 50 parts by weight of a film-forming polymer into a predetermined configuration; stabilizing the formed mass in the predetermined configuration; and subjecting the stabilized configuration to a temperature in the range of about 3000 to 4000° F. in the presence of an amount of molten silicon at least sufficient to react with all of the carbon which is present in the said plastic mass to form silicon carbide therefrom; to wet each particle of silicon carbide which is present with silicon, and to fill all voids in the silicon carbide structure; and continuing the said heating for a period of time sufficient to eliminate the said polymer and convert the stabilized configuration to siliconized silicon carbide.

7. The method for coating the surfaces of articles comprised of carbon with a tightly adherent, continuous, impermeable external coating of siliconized silicon carbide, which consists in applying to the surface to be coated a continuous film of a plastic mass consisting essentially of a substantially homogeneous mixture of about 100 parts by weight of finely divided carbon not more than about 50 microns in diameter, about 100 to 500 parts by weight of finely divided silicon carbide not more than about 50 microns in diameter and about 5 to 50 parts by weight of a film-forming polymer; stabilizing the film on the said surface; and subjecting the stabilized film to a temperature in the range of about 3000 to 4000° F. in the presence of an amount of molten silicon at least sufficient to react with all of the carbon which is present in the film to form silicon carbide therefrom, to wet each particle of silicon carbide which is present with silicon, and to fill all voids in the silicon carbide structure; and continuing the said heating for a period of time sufficient to eliminate the said polymer and convert the stabilized film to siliconized silicon carbide.

8. The method according to claim 7, wherein the polymer is polyvinylbutyral.

9. The method for coating the surfaces of articles comprised of graphite with a tightly adherent, continuous, impermeable coating of siliconized silicon carbide, which consists in applying to the surface to be coated a plastic mass consisting essentially of a substantially homogeneous mixture of about 100 parts by weight of finely divided carbon not more than about 50 microns in diameter, about 100 to 500 parts by weight of finely divided silicon carbide not more than about 50 microns in diameter, and about 5 to 50 parts by weight of a film-forming polymer; stabilizing the film on the said surface; and subjecting the stabilized film to a temperature in the range of about 3000 to 4000° F. in the presence of an amount of molten silicon at least sufficient to react with all of the carbon which is present in the film to form silicon carbide therefrom, to wet each particle of silicon carbide which is present with silicon, and to fill all voids in the silicon carbide structure; and continuing the said heating for a period of time sufficient to eliminate the said polymer and convert the stabilized film to siliconized silicon carbide.

10. The method according to claim 9, wherein the polymer is polyvinylbutyral.

11. A method for joining graphite articles, which comprises applying to at least one of the complementary surfaces of graphite parts to be joined in a relatively thin substantially continuous coating of a plastic mass comprised of, in parts by weight, about 100 parts of finely divided carbon not more than about 50 microns in diameter, about 100 to 500 parts of finely divided silicon carbide not more than about 50 microns in diameter and about 5 to 50 parts of a film-forming polymer; bringing the parts to be joined into contact; stabilizing the coating; and heating the entire joint to a temperature in the range of about 3000 to 4000° F. in the presence of an amount of molten silicon at least sufficient to react with all of the carbon which is present to form silicon carbide therefrom, to wet each particle of silicon carbide which is present with silicon, and to fill all voids in the silicon carbide structure; and continuing the said heating for a period of time sufficient to eliminate the said polymer and convert the said coating to siliconized silicon carbide.

12. The method according to claim 11, wherein the polymer is polyvinylbutyral.

References Cited in the file of this patent

UNITED STATES PATENTS

| | | |
|---|---|---|
| 1,013,701 | Tone | Jan. 2, 1912 |
| 1,266,478 | Hutchins | May 14, 1918 |
| 1,868,631 | Doidge | July 26, 1932 |
| 2,431,326 | Heyroth | Nov. 25, 1947 |
| 2,431,327 | Geiger | Nov. 25, 1947 |
| 2,614,947 | Heyroth | Oct. 21, 1952 |
| 2,814,857 | Duckworth | Dec. 3, 1957 |
| 2,912,352 | Hopfner et al. | Nov. 10, 1959 |